Oct. 29, 1957 J. C. TRAVILLA 2,811,114
RAILWAY TRUCK STRUCTURE
Filed April 30, 1951 2 Sheets-Sheet 1
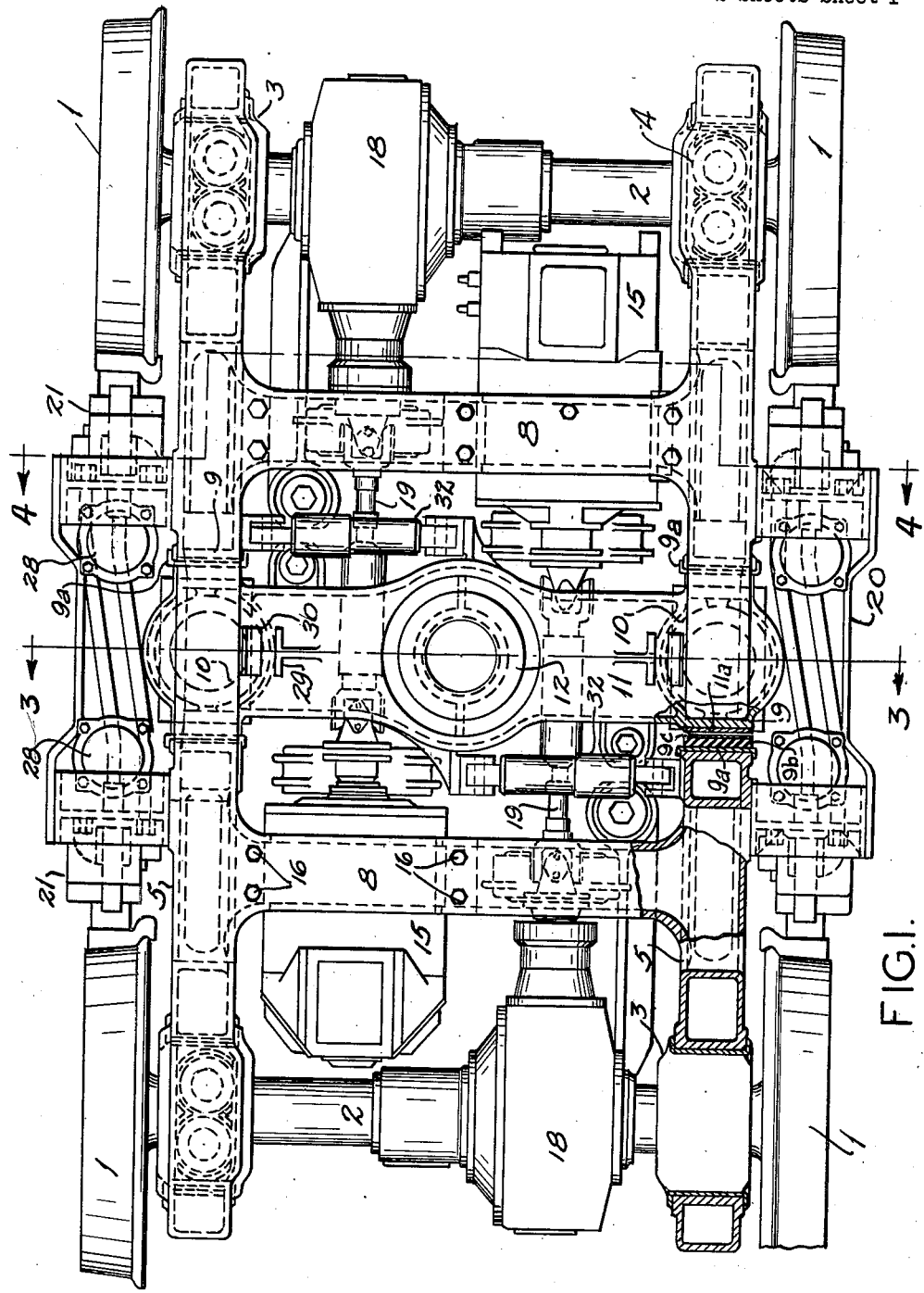
FIG.I.
Inventor
James C. Travilla
By Rodney Bedell
atty.

Oct. 29, 1957     J. C. TRAVILLA     2,811,114
RAILWAY TRUCK STRUCTURE
Filed April 30, 1951     2 Sheets-Sheet 2
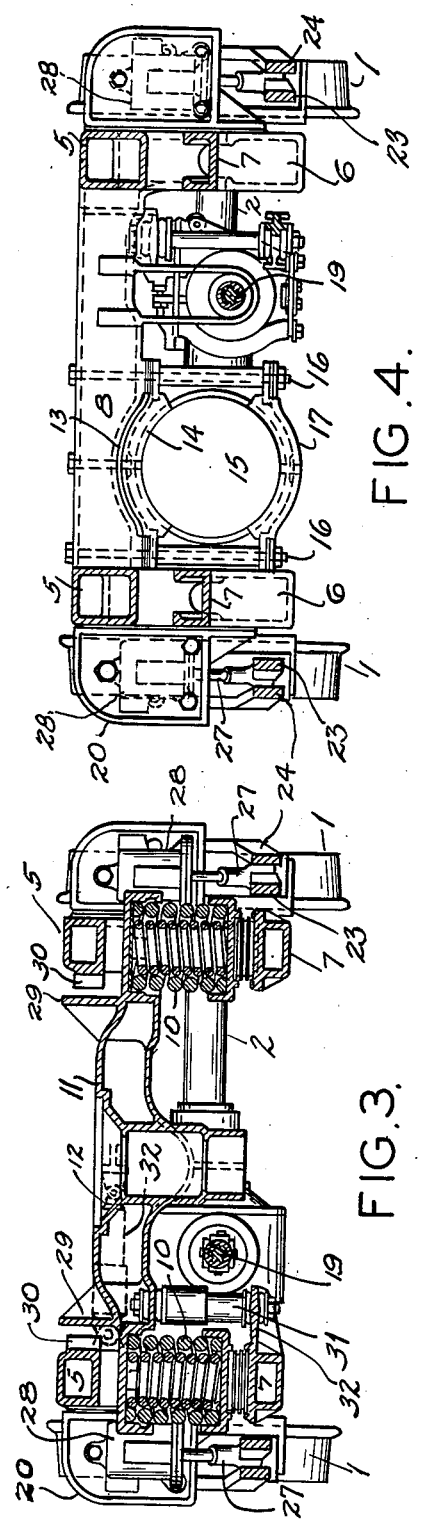
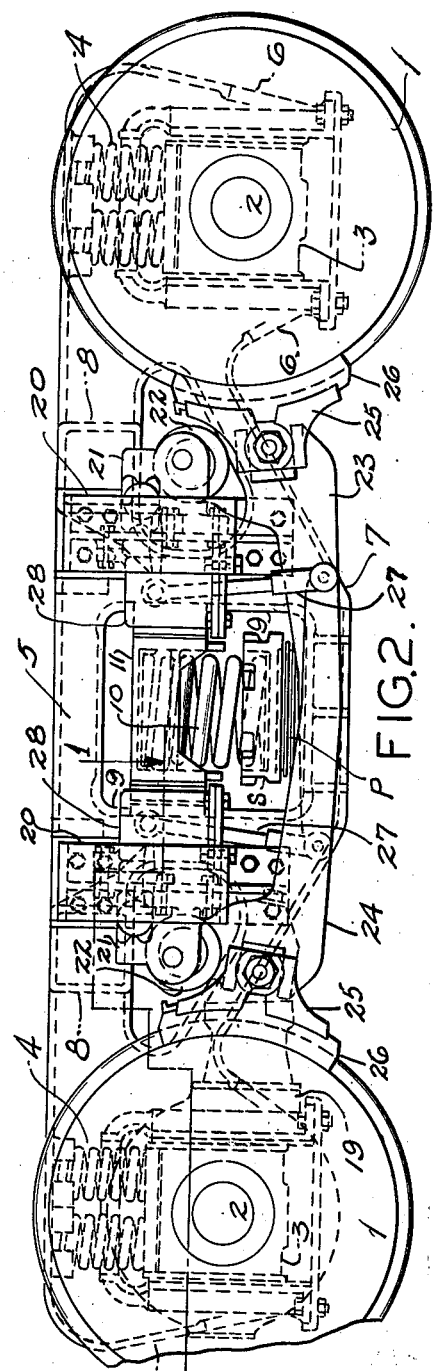
Inventor
James C. Travilla
By Rodney Bedell
atty.

United States Patent Office 2,811,114
Patented Oct. 29, 1957

2,811,114

RAILWAY TRUCK STRUCTURE

James C. Travilla, University City, Mo., assignor to General Steel Castings Corporation, Granite City, Ill., a corporation of Delaware Application April 30, 1951, Serial No. 223,729

2 Claims. (Cl. 105—197)

The invention relates to railway rolling stock and more particularly to railway motor truck structure and consists in a novel construction of a truck frame and the assembly of a bolster therewith and in a novel arrangement of the truck wheels and axles and driving motors of the truck with the truck frame and with the load-supporting bolster.

The main object of the invention is to produce a simple, light weight, strong motor truck having good riding qualities and easy maintenance.

Another object is to support a motor for each wheel and axle assembly directly on the truck frame but spaced substantially from the associated wheel and axle assembly and without interfering with an intermediate spring-supported bolster, the frame being spring-supported from the truck axles, whereby the motors are fully spring-supported.

Another object is to control the play of the bolster in the frame independently of the motor supports.

These and other detail objects, as will appear from the following description, are attained by the structure shown in the accompanying drawings, in which:

Figure 1 is a top view of a four wheel motor truck, a portion being sectioned horizontally on the line 1—1 of Figure 2.

Figure 2 is a side elevation of the truck.

Figures 3 and 4 are vertical, transverse sections taken on the corresponding section lines of Figure 1.

The truck wheels, indicated at 1, are fixed on axles 2 terminating with the wheels and are provided with journals inwardly of the wheels which seat the journal boxes 3. Each box mounts one or more coil springs 4. The truck frame is a rigid structure, preferably a casting, and includes top side members 5, pedestal legs 6 depending therefrom, adjacent legs receiving journal boxes 3 between them, bottom members 7 spaced vertically from top members 5, and transverse transoms 8.

Columns 9 extend between frame members 5 and 7 and, with the latter, form deep windows for receiving helical springs 10 having seats S mounted on pads P of rubber-like material carried on the frame lower members 7. The windows also receive the ends of a transverse bolster 11 mounted on springs 10 and provided with a load-carrying center plate 12. The bolster terminates adjacent the outer faces of the frame side members and inwardly from the wheel treads. The bolster ends are relatively shallow and the load-supporting middle portion is relatively deep. The bolster is positioned longitudinally of the truck by composite cushion and liner devices, each comprising a plate 9a secured to the column, a pad 9b of rubber-like material bonded to the plate, a wear plate 9c bonded to the other side of pad 9b, and a wear plate 11a secured to the bolster (Figure 1).

Members 5, 6, 7, 8, and 9 are of box section for greater rigidity and their walls merge with each other. Riveting and welding are substantially eliminated and each portion of each section may be effectively dimensioned to meet its special strength requirement.

Each transom 8 is recessed upwardly at 13 (Figure 4) to receive a bearing block 14 for a motor 15 which is suspended from the transom by bolts 16 and a lower bearing 17. Each motor 15 is operatively connected to the more remote axle 2 by a drive shaft 19 with suitable universal joint connections to the motor and a reduction gear 18. Each drive shaft extends under the bolster and under the transom remote from its motor.

At each side of the truck, the frame carries brake gear brackets 20 having slack adjuster housings 21 mounted thereon. Pivoted to housings 21 by eccentrics 22, adjustably operated by the slack adjuster actuating device, are a pair of bell cranks 23, 24. The short arm of each bell crank mounts an individual brake head 25 and shoe 26 for application to the adjacent wheel. The long arm of each bell crank is connected by an individual rod 27 to a piston in a brake cylinder 28, mounted on bracket 20. Upon admission of air to cylinders 28, the pistons and rods 27 are forced downwardly, tilting the crank arms about their pivots 22 and thrusting the brake shoes against the wheels. With this arrangement, the entire brake rigging is positioned between and in line with the wheels.

The mounting of the journal boxes on inside journals avoids the necessity for longitudinally extending equalizers because the load is applied to the axles between the wheels, whereby the axles act as equalizers extending transversely of the truck, and the comparatively short spacing apart of the journal boxes on each axle avoids severe diagonal loading of the truck frame, as would be present with outside journals.

Without the usual equalizers, the pedestals can be made as wide and strong as may be desired to adequately resist lateral forces and the pedestals do not require removable blocks, as may be necessary if equalizers were to be assembled with the pedestals.

The side frames are of truss formation and the axes of the bolster springs are in the same general longitudinal planes as the frame side members, and this provides for a lighter frame than one in which the bolster is supported by the frame transoms as in the usual arrangement of motor trucks. This positioning of the bolster springs leaves ample room at the side of the frame for mounting brake gear units in line with the wheels, as described above.

The entire structure is compact and of light weight as compared with the usual motor truck with outside journal bearings and longitudinal equalizers.

The bolster is stably supported on its springs but lateral movement is provided through deflection of the bolster springs and of the snubber of the supporting pads. Lateral movement is limited by the engagement of bolster flanges 29 with stops 30 on the truck frame. Preferably snubbers 32 connect the bolster and the truck frame and control the lateral action of the bolster due to the lateral flexing of the bolster springs and lateral yielding of spring seat springs. Upright snubbers 31 control the vertical movement of the bolster due to the action of springs 10. The bolster action and control are described and claimed in detail in an application filed by applicant and another August 7, 1946, Serial No. 689,032, now Patent No. 2,652,001, issued September 15, 1953.

The details of this structure may be varied substantially without departing from the spirit of the invention and the exclusive use of those modifications coming within the scope of the claims is contemplated.

What is claimed is:

1. In a railway motor truck, spaced wheel and axle assemblies, journal boxes on said assemblies inwardly of the truck from the wheels, springs mounted on the tops of said journal boxes, a rigid truck frame including top members, bottom members and transoms, the top members being spaced apart transversely of the truck, the bottom members being spaced vertically from the top members and the transoms being spaced apart longitudinally of the truck, there being pedestals depending from the frame and slidably receiving the journal boxes, springs seated on said frame bottom members, and a transverse load-supporting bolster mounted on said latter-mentioned springs.

2. In a railway truck, spaced wheel and axle assemblies, journal boxes on said assemblies inwardly of the wheels, a truck frame including side members with pedestals slidably receiving said journal boxes, each of said side members having a deep window intermediate the pedestals, coil springs seated on the lower member of said window, a transverse bolster with its ends supported on said springs, a bracket extending inwardly from the deep intermediate portion of each side frame, and a shock absorber with relatively movable ends connected to said bracket and to said bolster, respectively.

References Cited in the file of this patent

UNITED STATES PATENTS

| | | |
|---|---|---|
| 779,858 | Lillie | Jan. 10, 1905 |
| 1,510,539 | Blunt | Oct. 7, 1924 |
| 1,640,963 | Sanders | Aug. 30, 1927 |
| 1,705,568 | Horger | Mar. 19, 1929 |
| 1,841,662 | McCofferty | Jan. 19, 1932 |
| 1,875,380 | Howard et al. | Sept. 6, 1932 |
| 1,961,010 | Norbom | May 29, 1934 |
| 2,079,658 | Oelkers | May 11, 1937 |
| 2,168,293 | Kiesel | Aug. 1, 1939 |
| 2,177,953 | Stewart | Oct. 31, 1939 |
| 2,181,908 | Mussey | Dec. 5, 1939 |
| 2,186,008 | Chapman | Jan. 9, 1940 |
| 2,231,848 | Eksergian | Feb. 11, 1941 |
| 2,316,046 | Buckwalter | Apr. 6, 1943 |
| 2,330,912 | Pflager | Oct. 5, 1943 |
| 2,371,621 | Harwick | Mar. 20, 1945 |
| 2,384,459 | Eksergian | Sept. 11, 1945 |
| 2,386,577 | Statler et al. | Oct. 9, 1945 |
| 2,405,398 | Buckwalter | Aug. 6, 1946 |
| 2,473,678 | Dath | June 21, 1949 |
| 2,519,169 | Beemer et al. | Aug. 15, 1950 |
| 2,642,008 | Settles et al. | June 16, 1953 |